United States Patent
Lee et al.

(10) Patent No.: US 11,300,718 B2
(45) Date of Patent: Apr. 12, 2022

(54) COMPOSITION FOR NEAR-INFRARED LIGHT-ABSORBING FILMS, NEAR-INFRARED LIGHT-ABSORBING LAYERS, CAMERA MODULES, AND ELECTRONIC DEVICES

(71) Applicant: Samsung Electronics Co., Ltd., Suwon-si (KR)

(72) Inventors: Yong Joo Lee, Suwon-si (KR); Jong Hoon Won, Yongin-si (KR); Changki Kim, Suwon-Si (KR); Hyung Jun Kim, Suwon-si (KR); Myungsup Jung, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 642 days.

(21) Appl. No.: 16/023,023

(22) Filed: Jun. 29, 2018

(65) Prior Publication Data

US 2019/0079227 A1 Mar. 14, 2019

(30) Foreign Application Priority Data

Sep. 8, 2017 (KR) .................. 10-2017-0115217

(51) Int. Cl.
*G02B 5/20* (2006.01)
*C09B 23/08* (2006.01)
(Continued)

(52) U.S. Cl.
CPC ............ *G02B 5/208* (2013.01); *C09B 23/083* (2013.01); *C09B 57/007* (2013.01);
(Continued)

(58) Field of Classification Search
CPC .......... G02B 5/208; G02B 5/223; C09D 7/41; C09D 133/00; C09B 23/083;
(Continued)

(56) References Cited

U.S. PATENT DOCUMENTS 8,693,089 B2   4/2014   Saitoh et al.
9,726,784 B2   8/2017   Tsubouchi
(Continued)

FOREIGN PATENT DOCUMENTS

JP   2008/051985 A   3/2008
JP      5168917 B2   3/2013
(Continued)

OTHER PUBLICATIONS

Korean Office Action dated Jan. 6, 2022 for corresponding Korean Application No. 10-2017-0115217, and English-language translation thereof.

*Primary Examiner* — Ling Siu Choi
*Assistant Examiner* — Ronald Grinsted
(74) *Attorney, Agent, or Firm* — Harness, Dickey & Pierce, P.L.C.

(57) ABSTRACT

A composition for a near-infrared light-absorbing film includes a binder, a compound represented by Chemical Formula 1, and a compound represented by Chemical Formula 2, wherein a total amount of the compound represented by Chemical Formula 1 and the compound represented by Chemical Formula 2 ranges from about 2.0 parts by weight to about 2.6 parts by weight based on 100 parts by weight of the binder. A near-infrared light-absorbing film may include a near-infrared light-absorbing layer including a cured product of the composition. A camera device may include the near-infrared light-absorbing film, and an electronic device may include the camera device.

17 Claims, 9 Drawing Sheets

(51) Int. Cl.
  *C09D 133/00* (2006.01)
  *C09D 7/41* (2018.01)
  *C09B 57/00* (2006.01)
  *C09B 67/00* (2006.01)
  *G02B 5/22* (2006.01)
  *C09B 67/02* (2006.01)
  *C09B 67/22* (2006.01)
  C08K 5/3417 (2006.01)
  C08K 5/00 (2006.01)

(52) U.S. Cl.
  CPC ...... *C09B 67/0034* (2013.01); *C09B 67/0097* (2013.01); *C09D 7/41* (2018.01); *C09D 133/00* (2013.01); *G02B 5/223* (2013.01); *C08K 5/0041* (2013.01); *C08K 5/3417* (2013.01)

(58) Field of Classification Search
  CPC .............. C09B 57/007; C09B 67/0034; C09B 67/0097; C08K 5/0041; C08K 5/3417
  USPC ........................................................ 252/587
  See application file for complete search history.

(56) References Cited

U.S. PATENT DOCUMENTS

| | | | | |
|---|---|---|---|---|
| 9,746,595 | B2* | 8/2017 | Nagaya | ............ H01L 27/14621 |
| 2010/0220388 | A1 | 9/2010 | Suzuki et al. | |
| 2015/0346403 | A1 | 12/2015 | Jidai et al. | |
| 2016/0195651 | A1 | 7/2016 | Yoshioka et al. | |
| 2017/0017023 | A1 | 1/2017 | Sugiyama et al. | |

FOREIGN PATENT DOCUMENTS

| | | | |
|---|---|---|---|
| JP | 5449659 | B2 | 3/2014 |
| JP | 2014/191346 | A | 10/2014 |
| JP | 2015/172004 | A | 10/2015 |
| JP | 6017805 | B2 | 11/2016 |
| JP | 6087464 | B1 | 3/2017 |
| KR | 1374755 | B1 | 3/2014 |
| KR | 2014-0041528 | A | 4/2014 |
| KR | 2014/0069130 | A | 6/2014 |
| KR | 2015/0023375 | A | 3/2015 |
| KR | 1611807 | B1 | 4/2016 |
| KR | 2016/0111877 | A | 9/2016 |
| KR | 2016/0130987 | A | 11/2016 |

* cited by examiner

COMPOSITION FOR NEAR-INFRARED LIGHT-ABSORBING FILMS, NEAR-INFRARED LIGHT-ABSORBING LAYERS, CAMERA MODULES, AND ELECTRONIC DEVICES

CROSS-REFERENCE TO RELATED APPLICATIONS

This application claims priority to and the benefit, under 35 U.S.C. § 119, of Korean Patent Application No. 10-2017-0115217 filed in the Korean Intellectual Property Office on Sep. 8, 2017, the entire contents of which are incorporated herein by reference.

BACKGROUND

1. Field

A composition for near-infrared light-absorbing films, near-infrared light-absorbing layers, camera modules, and electronic devices are disclosed.

2. Description of the Related Art

Recently, electronic devices including image sensors that store an image as an electrical signal, such as cell phones, digital cameras, camcorders, and cameras, have been widely used.

An electronic device may include an optical filter including a near-infrared light-absorbing film, so that the electronic device is configured to reduce or prevent generation of an optical distortion by light in the other wavelength spectra of light than a particular visible wavelength spectrum of light.

The near-infrared light-absorbing film is mounted on a front surface of an image sensor of a camera module and absorbs at least one beam of light in a near-infrared wavelength spectrum of light from outside (e.g., an ambient environment) effectively and solves an optical distortion phenomenon.

The near-infrared light-absorbing film may be manufactured based on coating a composition and drying the same, and a conventional composition includes a copper sulfonate salt. However, the copper sulfonate salt has very low UV absorption capability (intensity), and thus has to be used in an excessive amount. Therefore, viscosity increase during preparation of high concentration copper salt solution may be caused; such a viscosity increase is not desirable for manufacture of a thin film.

In addition, it has been suggested that an organic dye may be used instead of a copper sulfonate salt, but the organic dye may have a relatively narrow UV absorption wavelength spectrum range and thus may result in the near-infrared light-absorbing film having degraded performance.

SUMMARY

Some example embodiments include a composition for a near-infrared light-absorbing film that has a thin thickness and is configured to reduce or prevent optical distortion effectively.

Some example embodiments include a near-infrared light-absorbing film including a near-infrared light-absorbing layer manufactured using the composition.

Some example embodiments include a camera module ("camera device") including the near-infrared light-absorbing film.

Some example embodiments include an electronic device including the camera device.

According to some example embodiments, a composition may include a binder, a compound represented by Chemical Formula 1, and a compound represented by Chemical Formula 2. A total amount of the compound represented by Chemical Formula 1 and the compound represented by Chemical Formula 2 ranges from about 2.0 parts by weight to about 2.6 parts by weight based on 100 parts by weight of the binder:

[Chemical Formula 1]

[Chemical Formula 2]

wherein, in Chemical Formula 1 and Chemical Formula 2, $R^1$ to $R^{20}$ are independently one substance of a hydrogen atom, a substituted or unsubstituted C1 to C20 alkyl group, and a substituted or unsubstituted C6 to C20 aryl group.

the compound represented by Chemical Formula 1 may be included in an amount of less than or equal to about 1.9 parts by weight based on 100 parts by weight of the binder, and the compound represented by Chemical Formula 2 may be included in an amount of less than or equal to about 0.7 parts by weight based on 100 parts by weight of the binder.

The compound represented by Chemical Formula 1 may be included in an amount of about 1.3 parts by weight to about 1.9 parts by weight based on 100 parts by weight of the binder, and the compound represented by Chemical Formula 2 is included in an amount of about 0.1 parts by weight to about 0.7 parts by weight based on 100 parts by weight of the binder.

The composition may further include a cyanine-based dye, a phthalocyanine-based dye, a dithiolene metal complex dye, or a diimmonium-based dye that have different structures from Chemical Formula 1.

The compound represented by Chemical Formula 1 and the compound represented by Chemical Formula 2 may have independently an absorbance at a maximum absorption wavelength ($\lambda_{max}$) that is at least about 20 times as great as an absorbance at a wavelength of about 550 nm.

A wavelength spectrum of light at which an average light transmittance of the composition is 50% may range from about 625 nm to about 645 nm.

The composition may have an average light transmittance of less than or equal to about 3% in a wavelength spectrum of light of about 700 nm to about 740 nm.

The composition may have an average light transmittance of greater than or equal to about 85% in a wavelength spectrum of light of about 430 nm to about 565 nm.

The binder may include at least one binder of an acrylic binder and an epoxy binder.

According to some example embodiments, a near-infrared light-absorbing film may include a near-infrared light-absorbing layer including a cured product of the composition.

The near-infrared light-absorbing film may further include a polymer film on one surface of the near-infrared light-absorbing layer.

The polymer film may include at least one material of polyethylene terephthalate, polyethylene naphthalate, triacetyl cellulose, polycarbonate, a cycloolefin polymer, poly(meth)acrylate, and polyimide.

The polymer film may be configured to selectively absorb light in a wavelength spectrum of light that is at least a portion of an ultraviolet (UV) wavelength spectrum of light.

The near-infrared light-absorbing film may further include an additional near-infrared light-absorbing layer on at least one surface of a surface of the polymer film and a surface of the near-infrared light-absorbing layer.

The additional near-infrared light-absorbing layer may include a copper phosphate salt.

The near-infrared light-absorbing film may have a thickness of about 25 μm to about 160 μm.

According to some example embodiments, a camera device may include the near-infrared light-absorbing film.

The camera device may further include a lens and an image sensor.

According to some example embodiments, an electronic device may include the camera device.

The near-infrared light-absorbing film having a thin thickness and capable of preventing light in a near-infrared wavelength spectrum of light effectively thus reduces or prevents optical distortion effectively.

DETAILED DESCRIPTION

As used herein, when specific definition is not otherwise provided, "alkyl group" refers to a C1 to C20 alkyl group and "aryl group" refers to a C6 to C20 aryl group.

As used herein, when specific definition is not otherwise provided, "substituted" refers to replacement of at least one hydrogen by a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when a definition is not otherwise provided, in chemical formulae, hydrogen is bonded at the position when a chemical bond is not drawn where supposed to be given.

As used herein, an average light transmittance refers to an average value of light transmittances measured when incident light is radiated in a vertical direction (a front side direction) of an optical filter.

Hereinafter, example embodiments will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a composition for a near-infrared light-absorbing film according to some example embodiments is described.

A composition for a near-infrared light-absorbing film according to some example embodiments includes a binder, a compound represented by Chemical Formula 1, and a compound represented by Chemical Formula 2, wherein a total amount of the compound represented by Chemical Formula 1 and the compound represented by Chemical Formula 2 ranges from about 2.0 parts by weight to about 2.6 parts by weight based on 100 parts by weight of the binder.

[Chemical Formula 1]

-continued

[Chemical Formula 2]

In Chemical Formula 1 and Chemical Formula 2, $R^1$ to $R^{20}$ are independently one substance of a hydrogen atom, a substituted or unsubstituted C1 to C20 alkyl group, and a substituted or unsubstituted C6 to C20 aryl group.

For example, the $R^1$ to $R^6$ may independently be a substituted or unsubstituted C1 to C10 alkyl group.

An organic dye has a relatively narrow UV absorption wavelength spectrum range, and thus a single organic dye has a limit for absorbing light in a near-infrared wavelength spectrum of light (a single organic dye that expresses color and has a small UV absorption wavelength spectrum range is used as a medical labeling material for anti-cancer diagnosis and the like or a coloring material for clothes).

A composition according to some example embodiments includes two kinds ("types") of organic dyes, specifically the compound represented by Chemical Formula 1 (dye) and the compound represented by Chemical Formula 2 (dye) along with a binder, and thereby problems of a conventional organic dye having ("associated with," "including," etc.) a narrow UV absorption wavelength spectrum range may be solved. Amounts of the dyes represented by Chemical Formula 1 and Chemical Formula 2 are limited to about 2.0 parts by weight to about 2.6 parts by weight based on 100 parts by weight of the binder, and thereby light transmittance in a near-infrared wavelength spectrum of light, for example in a wavelength spectrum of about 700 nm to about 770 nm, for example in a wavelength spectrum of about 700 nm to about 740 nm may be less than or equal to about 3%, for example less than or equal to about 2%, and thus it may be applicable to manufacture of a near-infrared light-absorbing film of an optical filter. In addition, when amounts of the dyes represented by Chemical Formula 1 and Chemical Formula 2 are limited within the ranges, light transmittance in a particular visible wavelength spectrum of light, for example a wavelength spectrum of about 430 nm to about 565 nm may be greater than or equal to about 85%, and thus it may be applicable to manufacture of a near-infrared light-absorbing film of an optical filter.

For example, when the dye represented by Chemical Formula 1 is used alone, light transmittance in a near-infrared wavelength spectrum of light may be greater than or equal to about 4% and thus it is not desirable as a composition for a near-infrared light-absorbing film. However, when the dye represented by Chemical Formula 1 and the dye represented by Chemical Formula 2 are mixed, a smaller amount of a dye may be used than that of dye when the dye represented by Chemical Formula 1 is used alone, light transmittance in a near-infrared wavelength spectrum of light may be decreased into less than or equal to about 3%, for example less than or equal to about 2% while not decreasing transmittance in a particular visible wavelength spectrum of light, thereby improving the performance of the near-infrared light-absorbing film that includes the composition, and thus it is desirable as a composition for a near-infrared light-absorbing film.

Particularly, the dye represented by Chemical Formula 1 may be included in an amount of less than or equal to about 1.9 parts by weight based on 100 parts by weight of the binder and the dye represented by Chemical Formula 2 may be included in an amount of less than or equal to about 0.7 parts by weight based on 100 parts by weight of the binder. In a composition including both of the dye represented by Chemical Formula 1 and the dye represented by Chemical Formula 2, when the dye represented by Chemical Formula 1 is included in an amount of greater than about 1.9 parts by weight based on 100 parts by weight of the binder or the dye represented by Chemical Formula 2 is included in an amount of greater than about 0.7 parts by weight based on 100 parts by weight of the binder, a wavelength at which light transmittance is 50% may be less than 625 nm. When a wavelength at which light transmittance is 50% is less than 625 nm, transmittance for red light becomes smaller and transmittance in an entire particular visible wavelength spectrum of light needs to be controlled.

For example, the dye represented by Chemical Formula 1 may be included in an amount of about 1.3 parts by weight to about 1.9 parts by weight based on 100 parts by weight of the binder, and the dye represented by Chemical Formula 2 may be included in an amount of about 0.1 parts by weight to about 0.7 parts by weight based on 100 parts by weight of the binder. When the dye represented by Chemical Formula 1 is included in an amount of less than about 1.3 parts by weight based on 100 parts by weight of the binder or the dye represented by Chemical Formula 2 is included in an amount of less than about 0.1 parts by weight based on 100 parts by weight of the binder, light transmittance in a near-infrared wavelength spectrum of light, for example a wavelength spectrum of about 700 nm to about 740 nm may be greater than about 4%.

Figure 9:
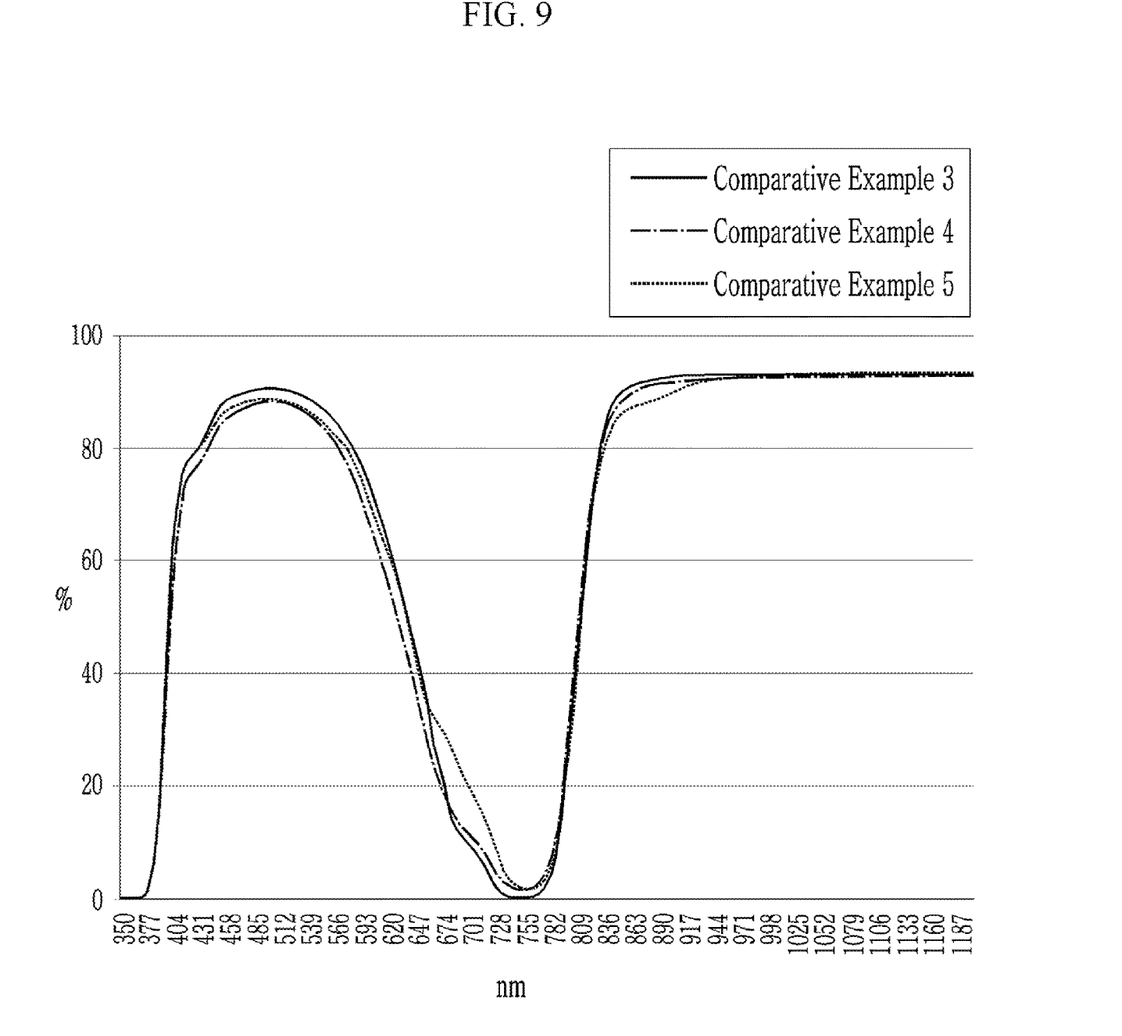

On the other hand, as shown in FIG. 9, because the dye represented by Chemical Formula 1 and the dye represented by Chemical Formula 2 have an absorbance at a maximum absorption wavelength ($\lambda_{max}$) that is at least about 20 times as high ("at least about 20 times as great") as an absorbance at a 550 nm wavelength, light transmittance in a particular visible wavelength spectrum of light may be greater than or equal to about 85% while light transmittance in a near-infrared wavelength spectrum of light may be less than or equal to about 3%, for example less than or equal to about 2%.

When the absorbance of the dye at a maximum absorption wavelength ($\lambda_{max}$) is less than about 20 times as great as the absorbance at a wavelength of about 550 nm, light transmittance in a particular visible wavelength spectrum of light may be decreased and the above properties may not be obtained, and thus it is desirable as a composition for a near-infrared light-absorbing film according to some example embodiments.

The composition may further include a dye having a different structure from Chemical Formula 1 and Chemical Formula 2. In this case, light transmittance in a wavelength spectrum of light of about 740 nm to about 1200 nm may be improved.

The dye having a different structure from Chemical Formula 1 and Chemical Formula 2 may include, for example, a polymethine compound, a cyanine compound, a phthalocyanine compound, a merocyanine compound, naphthalocyanine, immonium compound, a diimmonium compound, a triarylmethane compound, a dipyrromethene compound, an anthraquinone compound, naphthoquinone, a diquinone compound, a squarylium compound, a rylene compound, a perylene compound, a squaraine compound, a pyrylium compound, a thiopyrylium compound, a diketopyrrolopyrrole compound, a dithiolene metal complex compound, a derivative thereof, or a combination thereof, but is not limited thereto.

For example, the dye having a different structure from Chemical Formula 1 and Chemical Formula 2 may be a cyanine-based dye, a phthalocyanine-based dye, a dithiolene metal complex dye, or a diimmonium-based dye.

A wavelength spectrum of light in which an average light transmittance of the composition is 50% may range from about 625 nm to about 645 nm.

The composition may have an average light transmittance of less than or equal to about 3%, for example less than or equal to about 2% in a wavelength spectrum of light of about 700 nm to about 740 nm. Herein, the average light transmittance refers to an average value of light transmittance measured when incident light is radiated in a vertical direction (front side direction) of the optical filter that will be described later.

The composition may have an average light transmittance of greater than or equal to about 80%, for example greater than or equal to about 85% or greater than or equal to about 86% in a wavelength spectrum of light of about 430 nm to about 565 nm. Herein, the average light transmittance refers to an average value of light transmittance measured when incident light is radiated in a vertical direction (front side direction) of the optical filter that will be described later.

The binder may be, for example an organic binder, an inorganic binder, an organic/inorganic binder, or a combination thereof, and may be mixed with the dyes represented by Chemical Formula 1 and Chemical Formula 2 or may disperse the dyes represented by Chemical Formula 1 and Chemical Formula 2. The binder is not particularly limited as long as it attaches the dyes represented by Chemical Formula 1 and Chemical Formula 2 to the polymer film well.

The binder may include at least one binder of an acrylic binder and an epoxy binder. Where the binder includes an acrylic binder, the acrylic binder may be a curable binder, for example a thermally curable binder, a photo-curable binder, or a combination thereof.

The binder may be for example methyl cellulose, ethyl cellulose, hydroxypropyl methyl cellulose (HPMC), hydroxypropyl cellulose (HPC), a xanthan gum, polyvinyl alcohol (PVA), polyvinyl pyrrolidone (PVP), carboxyl methyl cellulose, hydroxyethyl cellulose, or a combination thereof, but is not limited thereto.

Hereinafter, a near-infrared light-absorbing film according to some example embodiments, for example a near-infrared light-absorbing film including a near-infrared light-absorbing layer manufactured using the composition is described with reference to the drawings.

Figure 1:
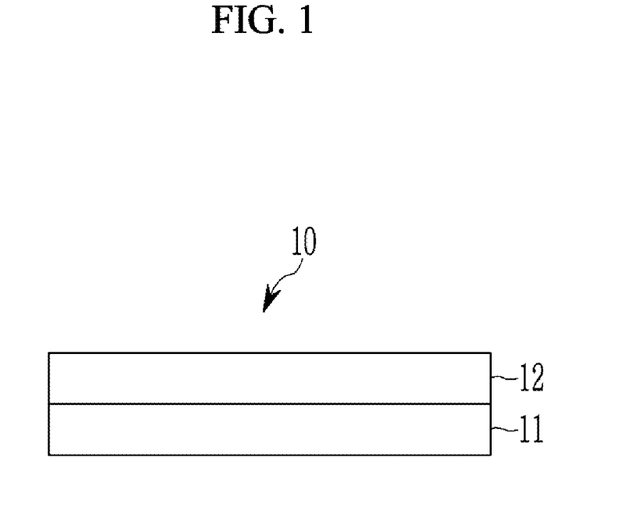
FIG. 1 is a schematic cross-sectional view showing a near-infrared light-absorbing film according to some example embodiments.

FIG. 1 is a schematic cross-sectional view showing a near-infrared light-absorbing film according to some example embodiments.

Referring to FIG. 1, a near-infrared light-absorbing film 10 according to some example embodiments includes a polymer film 11 and a near-infrared light-absorbing layer 12.

The polymer film 11 may be a transparent polymer film and have for example an average light transmittance of greater than or equal to about 80% in a particular visible wavelength spectrum of light. Within the range, it may have an average light transmittance of greater than or equal to about 85%. Herein, the particular visible wavelength spectrum of light may be for example a wavelength spectrum of light of greater than about 380 nm and less than about 700 nm, for example about 430 nm to about 565 nm and the average light transmittance is an average value of light transmittance measured when incident light is radiated in a vertical direction (a front side direction) of the polymer film 11.

The polymer film 11 may include, for example at least one material of polyethylene terephthalate, polyethylene naphthalate, triacetyl cellulose, polycarbonate, a cycloolefin polymer, poly(meth)acrylate, and polyimide, but is not limited thereto.

The polymer film 11 may selectively absorb at least one part of light in an ultraviolet (UV) wavelength spectrum (e.g., light in a wavelength spectrum of light that is at least a portion of an ultraviolet (UV) wavelength spectrum of light). Herein, the ultraviolet (UV) wavelength spectrum may be, for example a wavelength spectrum of light of less than or equal to about 380 nm.

The polymer film 11 may absorb most of light in a wavelength spectrum of light of at least about 350 nm to about 380 nm, and thus an average light transmittance of the near-infrared light-absorbing film 10 in a wavelength spectrum of light of about 350 nm to 380 nm may be less than or equal to about 1%, for example less than or equal to about 0.8% or less than or equal to about 0.5%.

The polymer film 11 may include various additives according to required properties of the near-infrared light-absorbing film 10.

The polymer film 11 may have a thickness of about 25 μm to about 105 μm.

The near-infrared light-absorbing layer 12 transmits light in a particular visible wavelength spectrum of light and selectively absorbs at least one part of light in a near-infrared wavelength spectrum of light. Herein the particular visible wavelength spectrum of light may be for example a wavelength spectrum of light of greater than about 380 nm and less than about 700 nm, for example about 430 nm to about 565 nm and the near-infrared wavelength spectrum of light may be for example a wavelength spectrum of light of about 780 nm to about 1200 nm, for example about 700 nm to about 1200 nm.

The near-infrared light-absorbing layer 12 may be formed from a solution including the dye, the binder, and a solvent.

The solvent is not particularly limited, as long as it dissolves and/or disperses the dye and the binder, and may be for example one or more selected from water; an alcohol based solvent such as methanol, ethanol, n-propyl alcohol, isopropyl alcohol, n-butanol, isobutanol, t-butanol, propylene glycol, propylene glycolmethylether, ethylene glycol, and the like; an aliphatic hydrocarbon solvent such as hexane, heptane, and the like; an aromatic hydrocarbon solvent such as toluene, pyridine, quinoline, anisole, mesitylene, xylene, and the like; a ketone-based solvent such as methyl isobutyl ketone, 1-methyl-2-pyrrolidinone (NMP), cyclohexanone, acetone, and the like; an ether-based solvent such as tetrahydrofuran, isopropyl ether, and the like; an acetate-based solvent such as ethyl acetate, butyl acetate, propylene glycol methyl ether acetate, and the like; an amide-based solvent such as dimethylacetamide, dimethyl formamide (DMF), and the like; a nitrile-based solvent such as acetonitrile, benzonitrile, and the like; and a mixture of the solvents, but is not limited thereto.

The solution may be coated on the polymer film 11, dried, and optionally cured by heat and/or light to form a cured product of a composition of the solution, such that the near-infrared light-absorbing layer 12 includes a cured product of the composition as described herein. The coating may be for example a spin coating, a slit coating, a bar coating, a blade coating, a slot die coating, and/or an inkjet coating. The drying may be for example performed by natural drying, hot air drying, and/or a heat treatment at a higher temperature than the boiling point of the solvent.

The near-infrared light-absorbing layer 12 may have for example a thickness of about 1 µm to about 20 µm.

The near-infrared light-absorbing film 10 has a structure where the polymer film 11 and the near-infrared light-absorbing layer 12 are sequentially stacked as described above and thereby light in a particular visible wavelength spectrum of light may be effectively transmitted and light in a near-infrared wavelength spectrum of light may be effectively blocked. In addition, light in a particular ultraviolet (UV) wavelength spectrum may be effectively blocked by imparting an absorption function of light in a particular ultraviolet (UV) wavelength spectrum to the polymer film 11. Accordingly, the near-infrared light-absorbing film 10 may effectively sense light in a particular visible wavelength spectrum of light in a sensor sensing light such as an image sensor by increasing purity of transmittance of light in a particular visible wavelength spectrum of light of light in all wavelength spectra of light and thus optical distortion by light besides particular visible wavelength spectrum of light may be decreased or prevented.

The near-infrared light-absorbing film 10 may effectively transmit light in a particular visible wavelength spectrum of light and selectively block light in a near-infrared wavelength spectrum of light by a combination of the polymer film 11 and the near-infrared light-absorbing layer 12.

The near-infrared light-absorbing film 10 may have, for example an average light transmittance of greater than or equal to about 70% in a particular visible wavelength spectrum of light of greater than about 380 nm and less than about 700 nm, and for example an average light transmittance of greater than or equal to about 80% or greater than or equal to about 85% in a wavelength spectrum of light of about 430 nm to about 565 nm. Herein, the average light transmittance refers to an average value of light transmittance measured when incident light is radiated in a vertical direction (front side direction) of the near-infrared light-absorbing film 10.

The near-infrared light-absorbing film 10 may have, for example an average light transmittance of less than or equal to about 45% in a near-infrared wavelength spectrum of light of about 740 nm to about 950 nm, less than or equal to about 5% in a near-infrared wavelength spectrum of light of about 700 nm to about 800 nm, and/or less than or equal to about 3%, for example less than or equal to about 2% in a near-infrared wavelength spectrum of light of about 700 nm to about 740 nm.

The near-infrared light-absorbing film 10 may have, for example a maximum absorption wavelength ($\lambda_{max}$) in a wavelength spectrum of light of about 700 nm to about 800 nm, a maximum absorption wavelength ($\lambda_{max}$) in a wavelength spectrum of light of about 700 nm to about 760 nm, and/or a maximum absorption wavelength ($\lambda_{max}$) in a wavelength spectrum of light of about 720 nm to about 750 nm.

The near-infrared light-absorbing film 10 may have, for example a maximum absorption wavelength ($\lambda_{max}$) in a wavelength spectrum of light of about 600 nm to about 800 nm, a maximum absorption wavelength ($\lambda_{max}$) in a wavelength spectrum of light of about 700 nm to about 800 nm, a maximum absorption wavelength ($\lambda_{max}$) in a wavelength spectrum of light of about 700 nm to about 760 nm, and/or a maximum absorption wavelength ($\lambda_{max}$) in a wavelength spectrum of light of about 720 nm to about 750 nm.

The near-infrared light-absorbing film 10 may have, for example a thickness of about 25 µm to about 160 µm. Within the thickness range, a thin optical filter may be realized. For example, the thin optical filter may include the near-infrared light-absorbing film 10.

In this way, the near-infrared light-absorbing film 10 may selectively absorb light in a particular near-infrared wavelength spectrum of light between a particular visible wavelength spectrum of light and a particular infrared wavelength spectrum of light in all wavelength spectra of light and blocks the light in the particular near-infrared wavelength spectrum of light, and thereby a cross or mixing of a signal by light in at least a particular visible wavelength spectrum of light and a signal by light in at least a particular non-visible wavelength spectrum of light may be prevented to decrease or prevent optical distortion such as a crosstalk, thereby resulting in improved operational performance of a device including the near-infrared light-absorbing film 10.

In addition, the near-infrared light-absorbing film 10 may effectively absorb light in a particular near-infrared wavelength spectrum of light regardless of an incidence direction of said light, and thus effectively absorbs incident light in a particular near-infrared wavelength spectrum of light from a side direction and blocks it, and thereby a distortion of a signal by light in a particular visible wavelength spectrum of light by incident light in a particular near-infrared wavelength spectrum of light from a side may be decreased or prevented.

Hereinafter, a near-infrared light-absorbing film according to some example embodiments is described.

Figure 2:
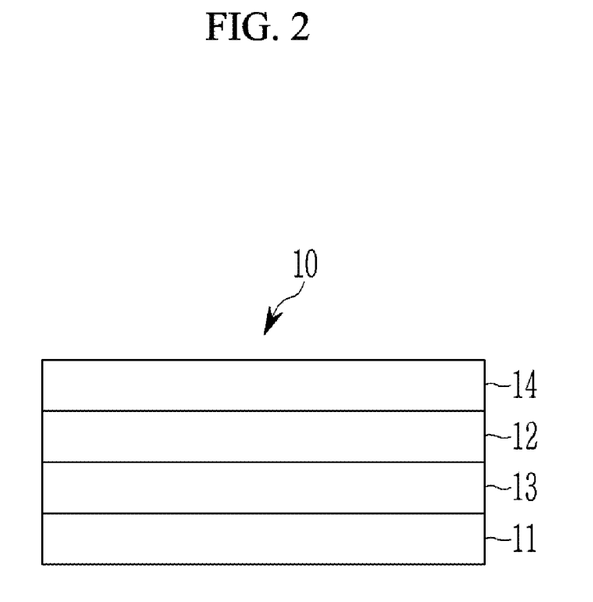
FIG. 2 is a schematic cross-sectional view showing a near-infrared light-absorbing film according to some example embodiments.

FIG. 2 is a schematic cross-sectional view showing a near-infrared light-absorbing film according to some example embodiments.

Referring to FIG. 2, a near-infrared light-absorbing film 10 according to some example embodiments includes a polymer film 11, a near-infrared light-absorbing layer 12, and other near-infrared light-absorbing layers 13 and 14 (one or more layers of the near-infrared light-absorbing layers 13 and 14 may be referred to herein as an "additional near-infrared light-absorbing layer").

The polymer film 11 and the near-infrared light-absorbing layer 12 are the same as described above.

The other near-infrared light-absorbing layers 13 and 14 may be disposed on an upper surface of the polymer film 11 and/or on an upper/lower surface of the near-infrared light-absorbing layer 12. Restated, an additional near-infrared light-absorbing layer 13 and/or 14 may be on at least one surface of a surface of the polymer film 11 and a surface of the near-infrared light-absorbing layer 12. In the drawing, the other near-infrared light-absorbing layers 13 and 14 are illustrated but one of them may be omitted.

The other near-infrared light-absorbing layers 13 and 14 (e.g., one or more additional near-infrared light-absorbing layers) may include a copper phosphate salt. The other near-infrared light-absorbing layers near infrared wavelength spectrum of light by additionally absorbing light due to the copper phosphate salt and thereby optical distortion by light in a near infrared wavelength spectrum of light may be effectively decreased or prevented.

The copper phosphate salt may be represented by Chemical Formula 3-1 or Chemical Formula 3-2, and the structures of the copper phosphate salt are not limited thereto.

[Chemical Formula 3-1]

[Chemical Formula 3-2]

In Chemical Formula 3-1 and Chemical Formula 3-2, $R^a$ to $R^e$ are independently a hydrogen atom or a substituted or unsubstituted C1 to C20 alkyl group.

A near infrared reflection layer may be included on an outer surface of the near-infrared light-absorbing layers 12, 13, and 14. The near infrared reflection layer may reflect light in a near infrared wavelength spectrum of light and thereby optical distortion by light in a near infrared wavelength spectrum of light may be effectively decreased or prevented.

The near infrared reflection layer are not particularly limited as long as they reflect light in a near infrared wavelength spectrum of light, and may be for example a high refractive index reflective layer, a reflective layer including a high refractive index nanoparticle, or a multi-layer including a plurality of layers having different refractive indexes, but is not limited thereto.

For example, the near infrared reflection layers may include a first layer and a second layer including materials having different refractive indexes, and may include a multilayer where the first layer and the second layer are alternately and repeatedly stacked.

The first layer and the second layer may be, for example a dielectric layer including an oxide layer, a nitride layer, an oxynitride layer, a sulfide layer, or a combination thereof, and for example the first layer may have a refractive index of less than about 1.7 and the second layer may have a refractive index of greater than or equal to about 1.7. Within the ranges, for example the first layer may have a refractive index of greater than or equal to about 1.1 and less than about 1.7 and the second layer may have a refractive index about 1.7 to about 2.7, or for example the first layer may have a refractive index of about 1.2 to about 1.6 and the second layer may have a refractive index of about 1.8 to about 2.5.

The first layer and the second layer may include any material having the refractive indexes within the ranges, and for example the first layer may include a silicon oxide, an aluminum oxide, or a combination thereof and the second layer may include titanium oxide, zinc oxide, indium oxide, zirconium oxide, or a combination thereof. The first layer and the second layer may be, for example a five-layered to 80-layered, for example 5-layered to 50-layered.

Thicknesses of the first layer and the second layer may be determined according to a refractive index and a reflection wavelength of each layer, for example each of the first layer may have a thickness of about 10 nm to about 700 nm and each of the second layer may have a thickness of about 30 nm to about 600 nm. Thicknesses of the first layer and the second layer may be the same or different.

The near infrared reflection layer may have, for example a thickness of about 1 μm to about 20 μm.

The near-infrared light-absorbing film 10 according to some example embodiments includes the polymer film 11 and the near-infrared light-absorbing layer 12 like and transmits light in a particular visible wavelength spectrum of light effectively and blocks light in a near-infrared wavelength spectrum of light effectively. In addition, the near-infrared light-absorbing film 10 according to some example embodiments further includes the other near-infrared light-absorbing layers 13 and 14 and thus may additionally absorb light in a particular near-infrared wavelength spectrum of light, and may be applied to an electronic device and a distortion of an optical signal of a particular visible wavelength spectrum of light by light in an infrared wavelength spectrum of light may be decreased or prevented.

The near-infrared light-absorbing film 10 may be applied to all uses for filtering light in a near-infrared wavelength spectrum of light, and may be, for example applied to a camera module and an electronic device including the same. The electronic device may be a digital camera, a camcorder, a monitoring camera such as CCTV, an in-car camera, a medical camera, a cell phone having a built-in or external camera, a computer having a built-in or external camera, a laptop computer having a built-in or external camera, and the like but is not limited thereto.

Figure 3:
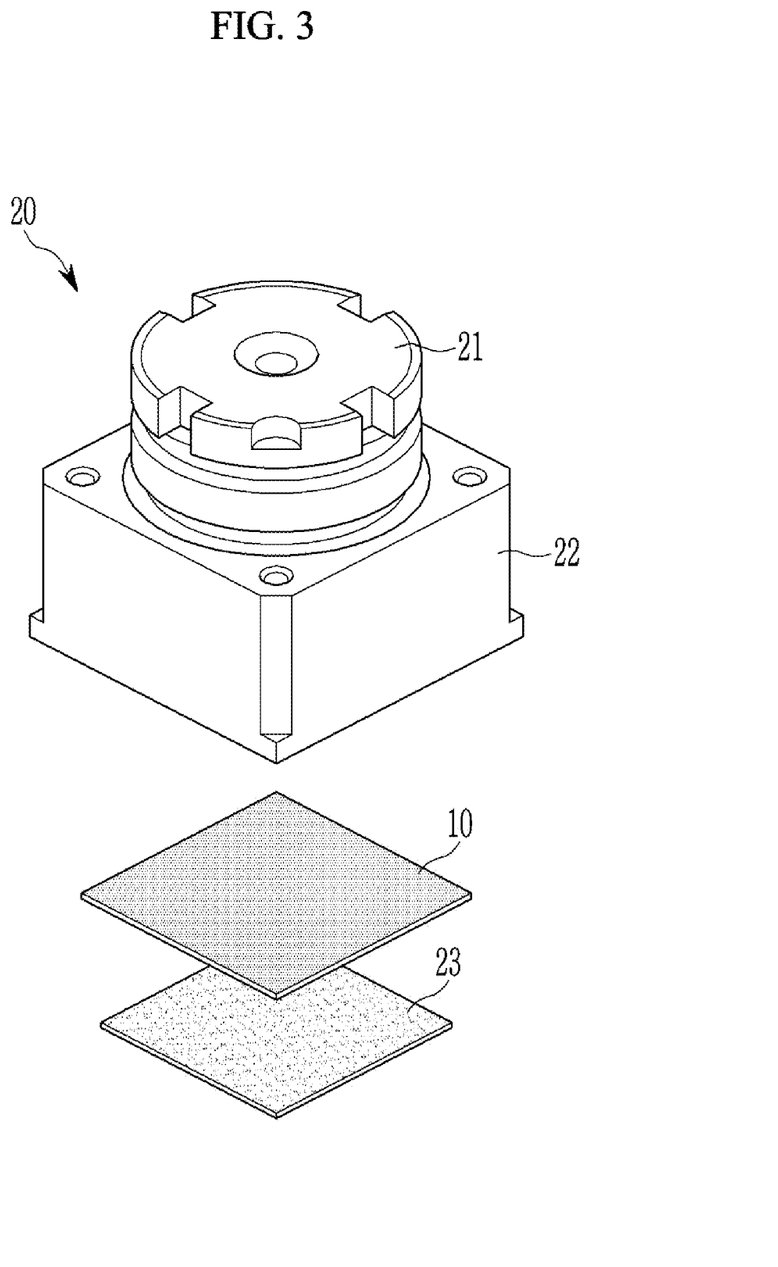
FIG. 3 is a schematic view showing a camera module according to some example embodiments.

FIG. 3 is a schematic view showing a camera module according to some example embodiments.

Referring to FIG. 3, a camera module 20 (also referred to herein as a "camera device") includes a lens barrel 21, a housing 22, a near-infrared light-absorbing film 10, and an image sensor 23. The near-infrared light-absorbing film 10 may be the near-infrared light-absorbing film shown in one or more of FIGS. 1-2.

The lens barrel 21 includes at least one lens imaging a subject, and the lens may be disposed along an optical axis direction. Herein, the optical axis direction may be a vertical direction of the lens barrel 21.

The lens barrel 21 is internally housed in the housing 22 and united with the housing 22. The lens barrel 21 may be moved in optical axis direction inside the housing 22 for autofocusing.

The housing 22 supports and houses the lens barrel 21 and may be open in the optical axis direction. Accordingly, incident light from one surface of the housing 22 may reach the image sensor 23 through the lens barrel 21 and the near-infrared light-absorbing film 10.

The housing 22 may be equipped with an actuator for moving the lens barrel 21 in the optical axis direction. The actuator may include a voice coil motor (VCM) including a magnet and a coil. However, various methods such as a mechanical driving system or a piezoelectric driving system using a piezoelectric device other than the actuator may be adopted.

The near-infrared light-absorbing film 10 is the same as described above.

The image sensor 23 may concentrate an image of a subject and thus store it as data, and the stored data may be displayed as an image through a display media.

The image sensor 23 may be mounted in a substrate (not shown) and electrically connected with the substrate. The substrate may be, for example, a printed circuit board (PCB) or electrically connected to a printed circuit board, and the printed circuit may be, for example, flexible printed circuit (FPCB).

The image sensor 23 concentrates light passing the lens barrel 21 and the near-infrared light-absorbing film 10 and generates a video signal and may be a complementary metal-oxide semiconductor (CMOS) image sensor and/or a charge coupled device (CCD) image sensor.

Figure 4:
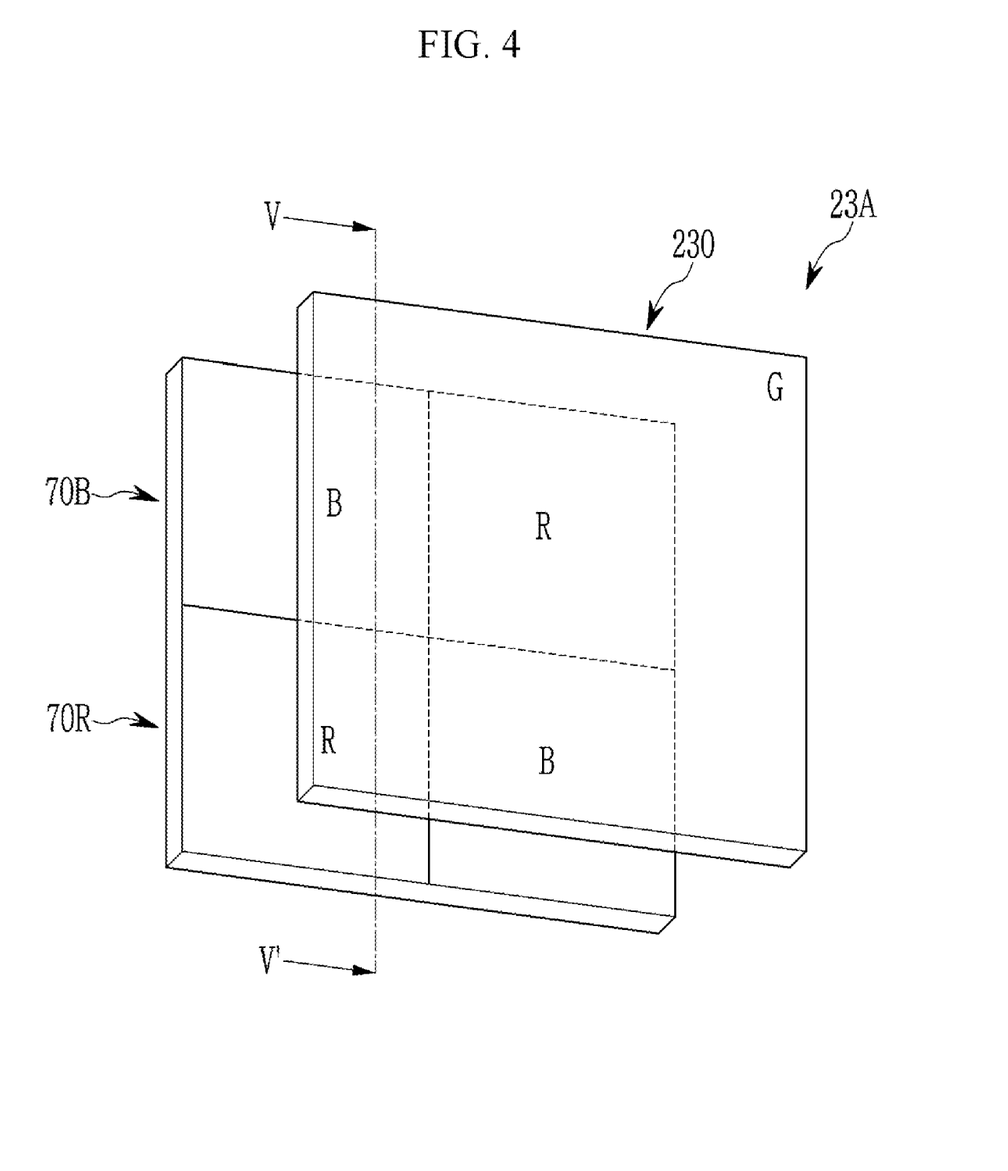
FIG. 4 is a top plan view showing an organic CMOS image sensor as an image sensor according to some example embodiments.
Figure 5:
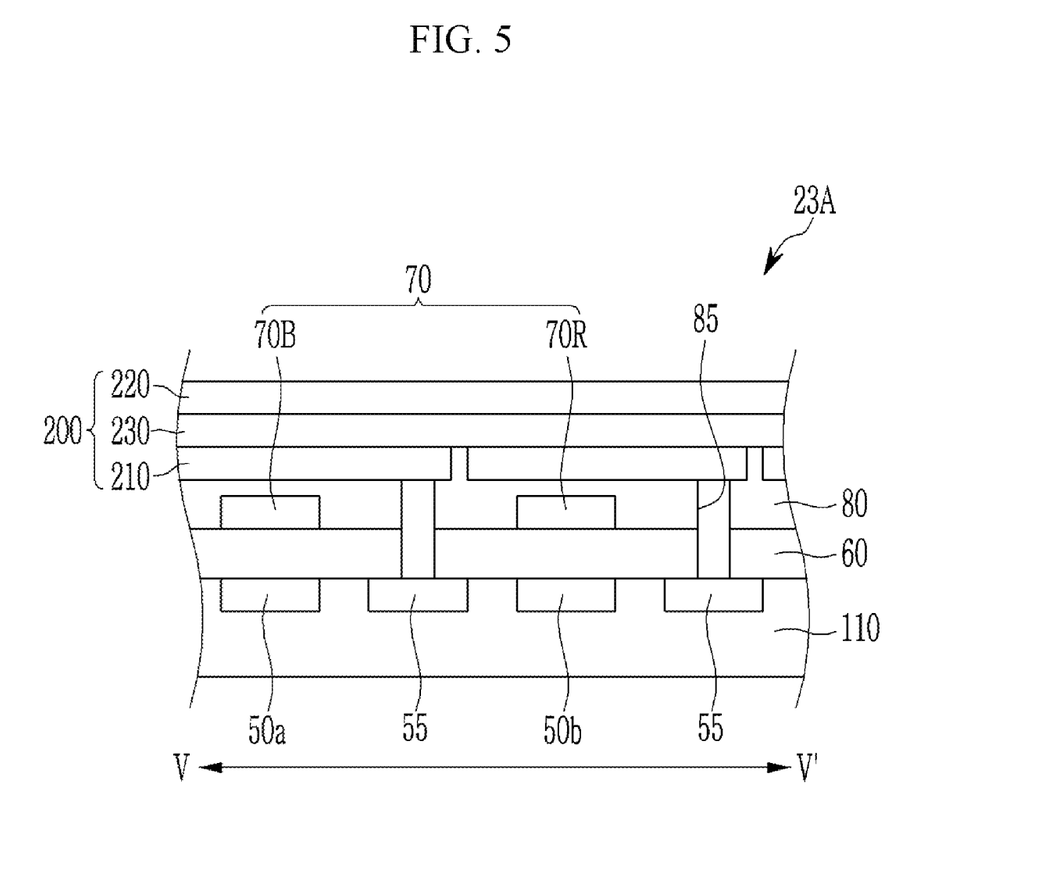
FIG. 5 is a cross-sectional view showing the organic CMOS image sensor of FIG. 4 along cross-sectional line V-V' of FIG. 4, and FIG. 6, FIG. 7, FIG. 8, and FIG. 9 are respectively graphs showing light transmittances depending on a wavelength of the compositions according to examples and comparative examples according to some example embodiments.
Figure 6:
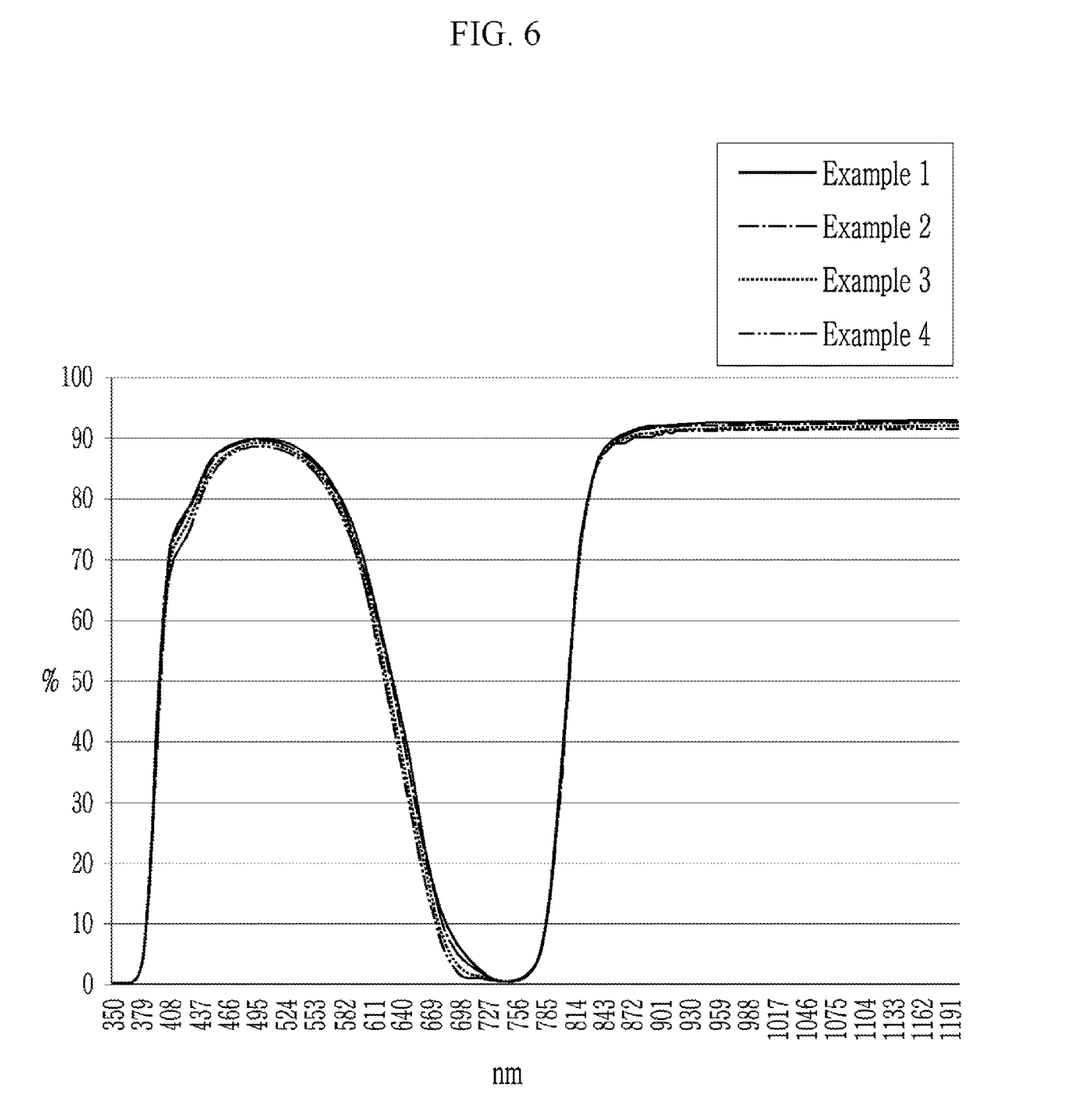
Figure 7:
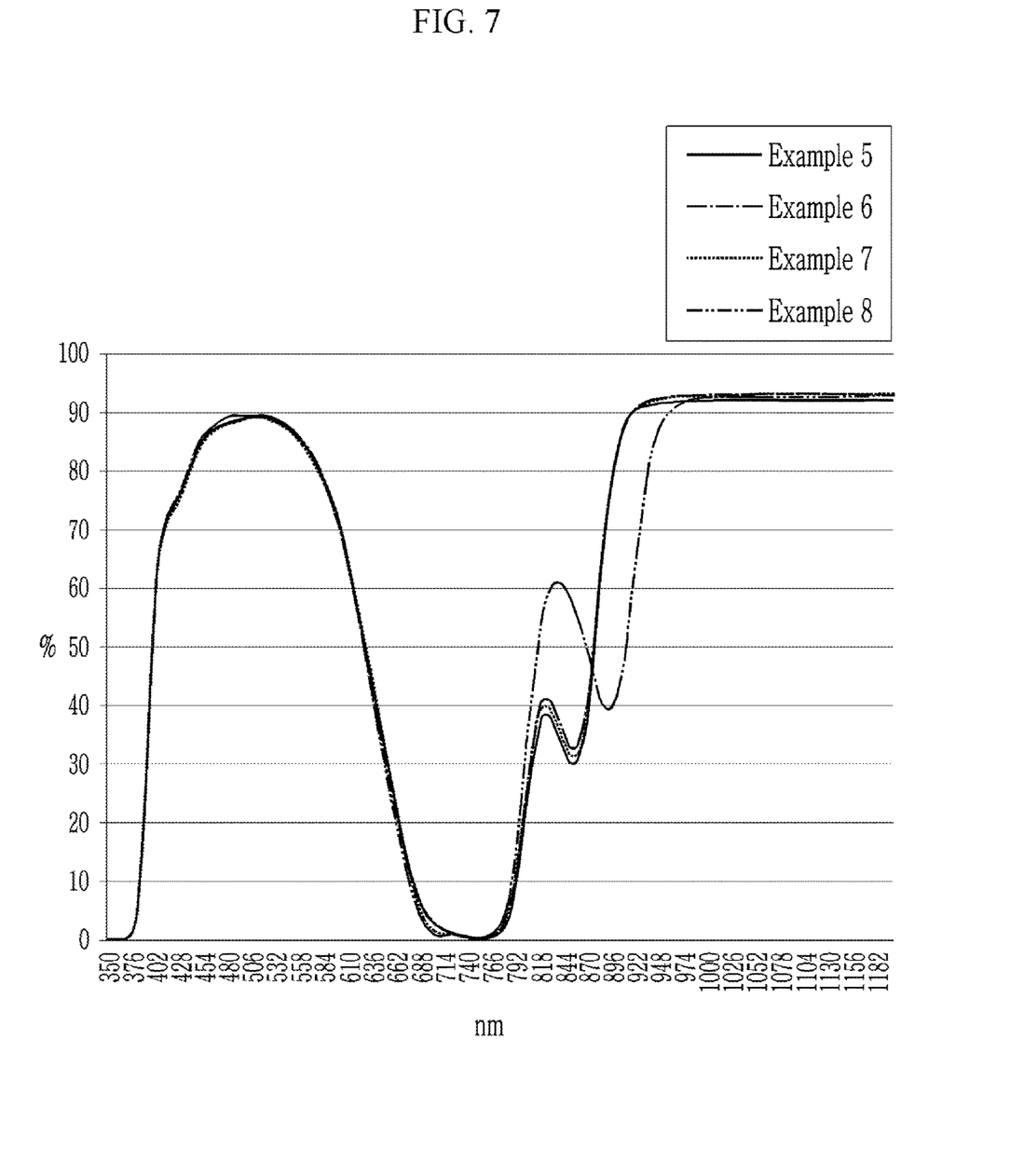
Figure 8:
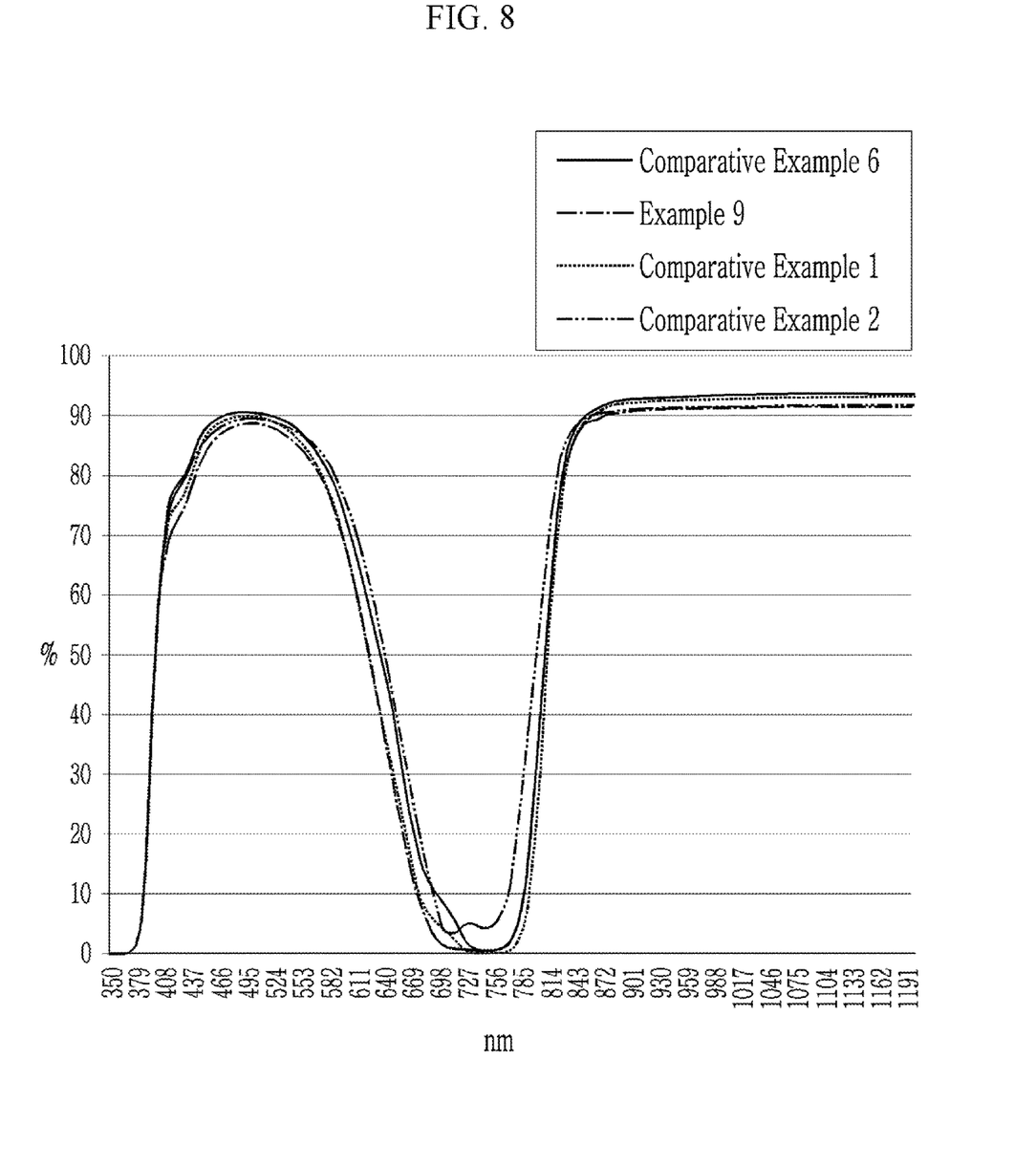

FIG. 4 is a top plan view showing an organic CMOS image sensor 23A as an image sensor according to some example embodiments and FIG. 5 is a cross-sectional view showing one example of the organic CMOS image sensor of FIG. 4 along cross-sectional line V-V' of FIG. 4. The image sensor 23A shown in FIGS. 4-5 may be the image sensor 23 shown in FIG. 3.

Referring to FIGS. 4 and 5, an organic CMOS image sensor 23A according to some example embodiments includes a semiconductor substrate 110 integrated with photo-sensing devices 50a and 50b, a transmission transistor (not shown), and a charge storage 55, a lower insulation layer 60, a color filter layer 70, a upper insulation layer 80, and an organic photoelectric device 200.

The semiconductor substrate 110 may be a silicon substrate, and is integrated with the photo-sensing devices 50a and 50b, the transmission transistor (not shown), and the charge storage 55. The photo-sensing devices 50a and 50b may be photodiodes.

The photo-sensing devices 50a and 50b, the transmission transistor, and/or the charge storage 55 may be integrated in each pixel, and for example as illustrated in the drawings, the photo-sensing devices 50a and 50b may be included in a blue pixel and a red pixel and the charge storage 55 may be included in a green pixel.

The photo-sensing devices 50a and 50b sense light, the information sensed by the photo-sensing devices may be transferred by the transmission transistor, the charge storage 55 is electrically connected to the organic photoelectric device 200, and the information of the charge storage 55 may be transferred by the transmission transistor.

A metal wire (not shown) and a pad (not shown) are formed on the semiconductor substrate 110. In order to decrease signal delay, the metal wire and pad may be made of a metal having low resistivity, for example, aluminum (Al), copper (Cu), silver (Ag), and alloys thereof, but is not limited thereto. However, it is not limited to the structure, and the metal wire and pad may be disposed under the photo-sensing devices 50a and 50b.

The lower insulation layer 60 is formed on the metal wire and the pad. The lower insulation layer 60 may be made of an inorganic insulating material such as a silicon oxide and/or a silicon nitride, or a low dielectric constant (low K) material such as SiC, SiCOH, SiCO, and SiOF. The lower insulation layer 60 has a trench exposing the charge storage 55. The trench may be filled with fillers.

A color filter layer 70 is formed on the lower insulation layer 60. The color filter layer 70 includes a blue filter 70B formed in the blue pixel and a red filter 70R formed in the red pixel. In some example embodiments, a green filter is not included, but a green filter may be further included.

The upper insulation layer 80 is formed on the color filter layer 70. The upper insulation layer 80 eliminates a step caused by the color filter layer 70 and smoothes the surface. The upper insulation layer 80 and lower insulation layer 60 may include a contact hole (not shown) exposing a pad, and a through-hole 85 exposing the charge storage 55 of a green pixel.

The organic photoelectric device 200 is formed on the upper insulation layer 80. The organic photoelectric device 200 includes a lower electrode 210 and an upper electrode 220 facing each other and a light-absorbing layer 230 disposed between the lower electrode 210 and the upper electrode 220.

The lower electrode 210 and the upper electrode 220 may be all light-transmitting electrodes and the light-absorbing layer 230 ("light absorption layer") may selectively absorb light in a green wavelength spectrum of light and may replace a color filter of a green pixel.

As described above, the semiconductor substrate 110 and the organic photoelectric device 200 selectively absorbing light in a green wavelength spectrum of light have a stack structure and thereby the size of an image sensor may be reduced to realize a down-sized image sensor.

Focusing lens (not shown) may be further formed on the organic photoelectric device 200. The focusing lens may control a direction of incident light and gather the light in one region. The focusing lens may have a shape of, for example, a cylinder or a hemisphere, but is not limited thereto.

In FIGS. 4 and 5, a structure where the organic photoelectric device selectively absorbing light in a green wavelength spectrum of light is stacked on the semiconductor substrate 110 is illustrated, but the present disclosure is not limited thereto. An organic photoelectric device selectively absorbing light in a blue wavelength spectrum of light may be stacked on the semiconductor substrate 110 and a green photo-sensing device and a red photo-sensing device may be integrated in the semiconductor substrate 110 or an organic photoelectric device selectively absorbing light in a red wavelength spectrum of light may be stacked on the semiconductor substrate 110 and a green photo-sensing device and a blue photo-sensing device may be integrated in the semiconductor substrate 110.

Among the light in a particular visible wavelength spectrum of light passing the lens barrel 21 and the near-infrared light-absorbing film 10, light in a green wavelength spectrum of light may be mainly absorbed in the light-absorbing layer 230 and photoelectrically converted, and light in a blue wavelength spectrum of light and a red wavelength spectrum of light may pass the lower electrode 210 and be sensed by the photo-sensing devices 50a and 50b.

As described above, the near-infrared light-absorbing film 10 may effectively transmit light in a particular visible wavelength spectrum of light but absorb and block light in a particular near-infrared wavelength spectrum of light and thus transfer pure light in a particular visible wavelength spectrum of light to an image sensor and resultantly, reduce or prevent a crosstalk generated when a signal by light in a particular visible wavelength spectrum of light and a signal by light in a particular non-visible wavelength spectrum of light are crossed and mixed in.

Hereinafter, the example embodiments are illustrated in more detail with reference to examples. However, these example embodiments are examples, and the present scope is not limited thereto.

Preparation of Composition

The dyes and acrylic binders (HT1335, SamHwa) are dispersed in a solvent (methyl ethyl ketone) to prepare compositions having each composition in Table 1 and Table 2.

TABLE 1

| | (unit: parts by weight) | | | | |
| --- | --- | --- | --- | --- | --- |
| | Dye 1 | Dye 2 | Dye 3 | Dye 4 | Binder |
| Example 1 | 1.9 | 0.2 | — | — | 100 |
| Example 2 | 1.9 | 0.3 | — | — | 100 |
| Example 3 | 1.9 | 0.5 | — | — | 100 |
| Example 4 | 1.9 | 0.7 | — | — | 100 |
| Example 5 | 1.9 | 0.2 | 0.5 | — | 100 |
| Example 6 | 1.9 | 0.3 | 0.5 | — | 100 |
| Example 7 | 1.9 | 0.5 | 0.5 | — | 100 |
| Example 8 | 1.9 | 0.7 | — | 0.5 | 100 |
| Example 9 | 2.5 | 0.02 | — | — | 100 |

TABLE 2

(unit: parts by weight)

|  | Dye 1 | Dye 2 | Dye 5 | Dye 6 | Binder |
|---|---|---|---|---|---|
| Comparative Example 1 | 1.9 | 0.02 | — | — | 100 |
| Comparative Example 2 | 1.0 | 0.7 | — | — | 100 |
| Comparative Example 3 | 3.0 | — | — | — | 100 |
| Comparative Example 4 | — | — | 3.0 | — | 100 |
| Comparative Example 5 | — | — | — | 3.0 | 100 |
| Comparative Example 6 | 1.9 | 0.71 | — | — | 100 |

[Dye 1]

[Dye 2]

SDA8690 (cyanine-based dye, H. W. Sands) [Dye 3]

SDA5680 (cyanine-based dye, H. W. Sands) [Dye 4]

[Dye 5]

[Dye 6]

Evaluation 1: Transmittance

Transmittance characteristics depending on a wavelength spectrum of light of the compositions according to Examples and Comparative Examples are evaluated.

The transmittance characteristics are measured using an UV-Vis spectrophotometer (SoldiSpec-3700, Shimadzu Corp.).

The results are shown in Table 3, Table 4, FIG. 6, FIG. 7, FIG. 8, and FIG. 9.

TABLE 3

|  | 430 nm-565 nm (%) | 700 nm-740 nm (%) | Wavelength (nm) at which light transmittance is 50% |
|---|---|---|---|
| Example 1 | 87.6 | 2.8 | 632 |
| Example 2 | 87.2 | 2.2 | 630 |
| Example 3 | 86.5 | 1.5 | 626 |
| Example 4 | 85.8 | 1.0 | 625 |
| Example 5 | 87.1 | 1.6 | 629 |
| Example 6 | 86.6 | 1.6 | 630 |
| Example 7 | 86.8 | 0.9 | 626 |
| Example 8 | 87.2 | 1.0 | 629 |
| Example 9 | 87.2 | 1.9 | 624 |

TABLE 4

|  | 430 nm-565 nm (%) | 700 nm-740 nm (%) | Wavelength (nm) at which average light transmittance is 50% |
|---|---|---|---|
| Comparative Example 1 | 88.3 | 4.2 | 636 |
| Comparative Example 2 | 87.5 | 4.3 | 639 |
| Comparative Example 3 | 88.4 | 4.2 | 637 |
| Comparative Example 4 | 85.6 | 6.2 | 625 |
| Comparative Example 5 | 86.8 | 10.4 | 635 |
| Comparative Example 6 | 85.8 | 1.0 | 623 |

Referring to Table 3, Table 4, FIG. 6, FIG. 7, FIG. 8, and FIG. 9, compositions according to Example 1 to Example 9 showed a light transmittance of greater than or equal to 85% in a particular visible wavelength spectrum of light and a light transmittance of less than or equal to 3% in a near-infrared wavelength spectrum of light compared with the compositions according to Comparative Example 1 to Comparative Example 6. Particularly when Dye 1 and Dye 2 are included simultaneously, an amount of Dye 1 is less than or equal to 1.9 parts by weight based on 100 parts by weight of the binder, and an amount of Dye 2 is less than or equal to about 0.7 parts by weight based on 100 parts by weight of the binder, a wavelength at which light transmittance is 50% is shown at 625 nm or greater.

While this disclosure has been described in connection with what is presently considered to be practical example embodiments, it is to be understood that the inventive concepts are not limited to the disclosed embodiments, but, on the contrary, is intended to cover various modifications and equivalent arrangements included within the spirit and scope of the appended claims.

<Description of symbols>

| | |
|---|---|
| 10: near-infrared light-absorbing film | 11: polymer film |
| 12: near-infrared light-absorbing layer | 13, 14: other near-infrared light-absorbing layer |
| 20: camera module | 21: lens barrel |
| 22: housing | 23: image sensor |

<Description of symbols>

23A: organic CMOS image sensor
50a, 50b: photo-sensing device
70: color filter layer
200: organic photoelectric device
220: upper electrode
60, 80: insulation layer
210: lower electrode
230: light-absorbing layer

What is claimed is:

1. A composition, comprising:
a binder, a compound represented by Chemical Formula 1, and a compound represented by Chemical Formula 2,
wherein a total amount of the compound represented by Chemical Formula 1 and the compound represented by Chemical Formula 2 ranges from about 2.0 parts by weight to about 2.6 parts by weight based on 100 parts by weight of the binder:

[Chemical Formula 1]

[Chemical Formula 2]

wherein, in Chemical Formula 1 and Chemical Formula 2, $R^1$ to $R^{20}$ are independently one substance of a hydrogen atom, a substituted or unsubstituted C1 to C20 alkyl group, and a substituted or unsubstituted C6 to C20 aryl group, and
n=3,
wherein the compound represented by Chemical Formula 1 is included in an amount of about 1.3 parts by weight to about 1.9 parts by weight based on 100 parts by weight of the binder, and
wherein the compound represented by Chemical Formula 2 is included in an amount of about 0.1 parts by weight to about 0.7 parts by weight based on 100 parts by weight of the binder.

2. The composition of claim 1, wherein the composition further includes a cyanine-based dye, a phthalocyanine-based dye, a dithiolene metal complex dye, or a diimmonium-based dye that have different structures from Chemical Formula 1.

3. The composition of claim 1, wherein the compound represented by Chemical Formula 1 and the compound represented by Chemical Formula 2 have independently an absorbance at a maximum absorption wavelength ($\lambda_{max}$) that is at least about 20 times as great as an absorbance at a wavelength of about 550 nm.

4. The composition of claim 1, wherein a wavelength spectrum of light at which an average light transmittance of the composition is 50% ranges from about 625 nm to about 645 nm.

5. The composition of claim 1, wherein the composition has an average light transmittance of less than or equal to about 3% in a wavelength spectrum of light of about 700 nm to about 740 nm.

6. The composition of claim 1, wherein the composition has an average light transmittance of greater than or equal to about 85% in a wavelength spectrum of light of about 430 nm to about 565 nm.

7. The composition of claim 1, wherein the binder includes at least one binder of an acrylic binder and an epoxy binder.

8. A film comprising:
a layer including a cured product of the composition of claim 1.

9. The film of claim 8, further comprising:
a polymer film on one surface of the layer.

10. The film of claim 9, wherein the polymer film includes at least one material of polyethylene terephthalate, polyethylene naphthalate, triacetyl cellulose, polycarbonate, a cycloolefin polymer, poly(meth)acrylate, and polyimide.

11. The film of claim 9, wherein the polymer film is configured to selectively absorb light in a wavelength spectrum of light that is at least a portion of an ultraviolet (UV) wavelength spectrum of light.

12. The film of claim 9, wherein the layer is configured to absorb near-infrared light, and the film further comprises:
an additional near-infrared light-absorbing layer on at least one surface of
a surface of the polymer film, and
a surface of the layer.

13. The film of claim 12, wherein the additional near-infrared light-absorbing layer includes a copper phosphate salt.

14. The film of claim 8, which has a thickness of about 25 μm to about 160 μm.

15. A camera device comprising the film of claim 8.

16. The camera device of claim 15, further comprising:
a lens; and
an image sensor.

17. An electronic device comprising the camera device of claim 15.

* * * * *